PORTABLE ELECTRONIC CHORD ORGAN

Filed Jan. 3, 1966

4 Sheets-Sheet 1

INVENTOR
KEITH D. RUPPERT

BY

Thomas A. Briody
ATTORNEY

INVENTOR
KEITH D. RUPPERT

Thomas A. Briody
HIS ATTORNEY

INVENTOR
KEITH D. RUPPERT
BY Thomas A. Briody
ATTORNEY

Sept. 1, 1970 K. D. RUPPERT 3,526,700

PORTABLE ELECTRONIC CHORD ORGAN

Filed Jan. 3, 1966 4 Sheets-Sheet 4

INVENTOR

KEITH D. RUPPERT

BY Thomas A. Briody

ATTORNEY 3,526,700

PORTABLE ELECTRONIC CHORD ORGAN

Keith D. Ruppert, Decatur, Ill., assignor to General Electric Company, a corporation of New York Filed Jan. 3, 1966, Ser. No. 518,086
Int. Cl. G10h *1/06, 5/04, 5/12*
U.S. Cl. 84—1.01 7 Claims

ABSTRACT OF THE DISCLOSURE

A portable wide range electronic chord organ which may use printed circuits and may be battery operated. Both chords and the melody are produced by single fingered playing. Filter circuits provide for simulating the sounds of a number of different wind and string instruments. The tone generators each include a transistorized Hartley oscillator and either two (three outputs) or three (four outputs) synchronized neon tube relaxation oscillators as frequency dividers.

This invention relates to electronic musical instruments, and more particularly to electronic chord organs which are portable and have large numbers of notes and instrument sounds.

Heretofore, low priced organs have been limited to the small, electric blower powered, vibrating reed type. These are limited to only one voice and they need an A.C. outlet to function. The present invention is an all electronic organ which can be constructed economically by printed circuit techniques and therefore can satisfy a public desired for a low cost wide range electronic organ. Also, the organ of the present invention may be battery operated, adapting the organ due to this feature and its small size, to be used as a portable musical instrument for outdoor entertaining.

The present invention also provides for a plurality of different sounds by the use of electronic filtering circuits which operate on harmonically rich input waves to shape the input waves in accordance with patterns normally produced by known musical instruments. Also, the portable electronic organ of the present invention is adapted to produce both the chords and the melody, by only single fingered playing.

The invention is carried out by a preferred embodiment which comprises a number of transistorized Hartley oscillators and a plurality of synchronized relaxation oscillators for producing a large number of available notes, each output wave form of the Hartley oscillators and relaxation oscillators being rich in harmonics, a plurality of voice filters for shaping the input waves to have desired sounds and being selectively connected to the output amplifier, buses which carry the oscillator outputs to the filters, and switching means responsive to the keys on the organ keyboard for selecting a musical chord combination of notes to be connected to the buses.

It is therefore an object of the present invention to provide a new and improved electronic organ.

It is a further object of the present invention to provide a new and improved portable electronic chord organ.

It is another object of the present invention to provide a new and improved switching means such that both chords and melody may be produced by single fingered playing.

It is yet another object of the present invention to provide new and improved tone generator circuitry comprising a master oscillator and relaxation oscillator dividers which synchronize reliably and have relatively low current drain.

The foregoing and other objects, features and advantages of the invention will be apparent from the following more particular description of a preferred embodiment of the invention, as illustrated in the accompanying drawings wherein, FIG. 1 is a block diagram of the oscillator arrangement for producing the available musical notes;

Figures 1, 2, 3:
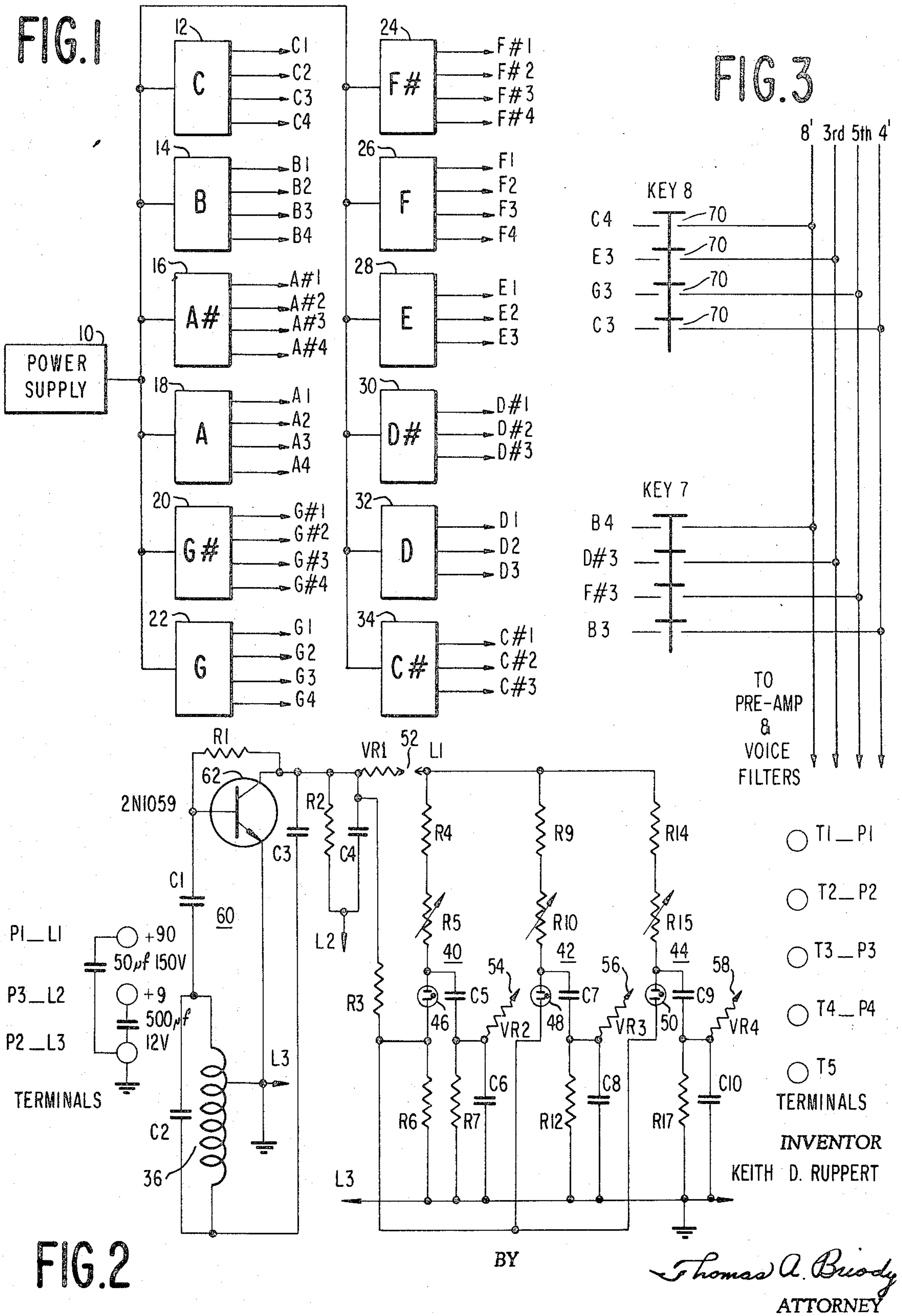
FIG. 2 is a schematic diagram of the Hartley oscillator and frequency divider of the present invention.
FIG. 3 is a schematic of a portion of a switching arrangement which may be used in the present invention.

In FIG. 1 there is shown a general block diagram of the available note producing system of the present invention. Each block, 12 through 34, represents a Hartley oscillator plus relaxation oscillator frequency dividers in combination, and the musical notes produced by each combination is indicated by the letter inserted in the block. A power supply for providing operating voltages for the oscillators is indicated by block 10.

Blocks 12 through 26 have four outputs each, indicating that they comprise one transistorized Hartley oscillator and three synchronized neon bulb relaxation oscillators, whereas the three outputs from each of blocks 28 through 34 indicates that they each comprise a single Hartley oscillator plus only two synchronized neon bulb relaxation oscillators. The total available notes produced by the above described system in a preferred embodiment of the invention, and their frequencies are given below.

AVAILABLE NOTES AND THEIR FREQUENCIES

| Note | 1<br>Oscillator | 2<br>Divider 1 | 3<br>Divider 2 | 4<br>Divider |
|---|---|---|---|---|
| C | 2,093.0 | 1,046.5 | 523.25 | 261.63 |
| B | 1,975.5 | 987.77 | 493.88 | 246.94 |
| A# | 1,864.7 | 932.33 | 466.16 | 233.08 |
| A | 1,760.0 | 880.0 | 440.0 | 220.0 |
| G# | 1,661.2 | 830.61 | 415.3 | 207.65 |
| G | 1,568.0 | 783.99 | 392.0 | 196.0 |
| F# | 1,480.0 | 739.99 | 369.99 | 185.0 |
| F | 1,396.9 | 698.46 | 349.23 | 174.61 |
| E | 1,318.5 | 659.26 | 329.63 | ------------ |
| D# | 1,244.5 | 622.26 | 311.13 | ------------ |
| D | 1,174.7 | 587.33 | 293.66 | ------------ |
| C# | 1,108.7 | 554.37 | 277.18 | ------------ |

Thus, it can be seen that in a preferred embodiment of the present invention 44 notes are available to the organ player.

A preferred circuit for the blocks 12 through 34 is indicated in FIG. 2, wherein there is shown a Hartley transistorized oscillator 60 and three neon bulb relaxation oscillators 40, 42, and 44. The Hartley oscillator 60 comprises a sigle transistor 62 and a tank circuit 36 which is tuned to a desired frequency corresponding to a desired musical note.

The differences between this Hartley oscillator circuit 60 and the conventional shunt-fed Hartley oscillator circuit reside in the manner of obtaining the output and in the shape of the output waveform. In a conventional circuit, the output is taken across the coil, or a portion thereof, and it is nearly a perfect sine wave. In the present invention, the output is taken from the transistor collector, across an incompletely bypassed load resistor $R_2$ and supply terminal $L_2$. It should be noted that terminal $L_2$ is the +9 volt supply terminal, $L_1$ is the +90 volt supply terminal, and $L_3$ is the ground terminal. The capacitor $C_4$ across the load resistor $R_2$ makes the circuit a semi-differentiator so that the output wave form is nearly a sawtooth. The sawtooth wave is rich in harmonics and has a much better shape for synchronizing the relaxation oscillators than does a pure sine wave.

The frequency dividers which produce submultiples of the Hartley oscillator output frequency are neon bulb relaxation oscillators whch are synchronized by the sawtooth output from the Hartley oscillator.

Figure 2A:
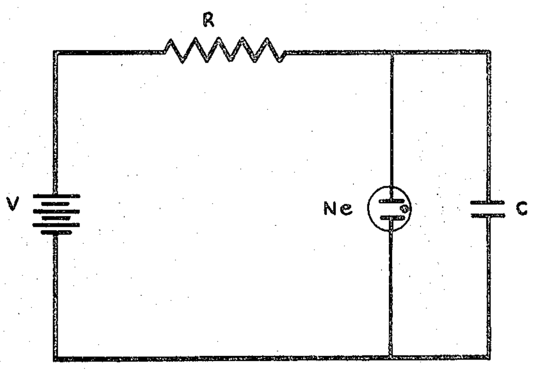
FIG. 2A shows, in simplified form, a typical prior art neon bulb type relaxation oscillator circuit.
Figure 2B:
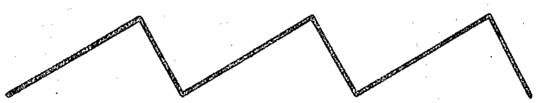
FIG. 2B shows a sawtooth waveform which may be created by discharge of the capacitor in the circuit of FIG. 2A.
Figure 2C:
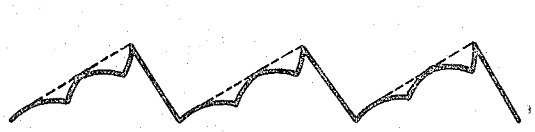
FIG. 2C shows an exaggerated waveform at the first divider of the circuit shown in FIG. 2.

For an understanding of the mode of operation of the neon bulb relaxation oscillators 40, 42, and 44, including the manner whereby their capacitors $C_5$, $C_7$ and $C_9$ charge through their respective resistors $R_4$–$R_5$, $R_9$–$R_{10}$, and $R_{14}$–$R_{15}$, attention is now directed to FIGS. 2*a*, 2*b*, and 2*c*. FIG. 2*a* shows, in its simplest form, a typical prior art neon bulb type relaxation oscillator. The capacitor C charges toward the supply voltage V at a rate determined by the RC time constant. The neon bulb Ne is not conducting during this period so it is a high impedance across the capacitor C and has practically no effect on the capacitor C charging. The capacitor C continues to charge until the neon bulb breakdown voltage is reached. At this point, the bulb Ne ionizes and its impedance drops to a low value. Current then flows through the neon bulb Ne and the capacitor C discharges through the bulb Ne at a rate determined by the RC time constant of the capacitor C and the low equivalent impedance of the bulb Ne. The discharge of the capacitor C continues until the extinquishing voltage of the neon bulb Ne is reached. At that time, the bulb Ne quits conducting and reverts back to its high impedance state and the capacitor C starts charging again. The equivalent impedance of the conducting bulb Ne is much less than R, so the capacitor C discharges much faster than it charges, creating a sawtooth waveform as shown in FIG. 2*b*. The neon bulb relaxation oscillator of FIG. 2*a* will free run at a frequency determined by the sum of the charge and discharge time. This free running frequency is equal to one over that sum.

To use the neon bulb relaxation oscillator of FIG. 2*a* as a frequency divider, the free running frequency is made to be slightly below the desired frequency and pulses from a synchronizing oscillator are added into the circuit in such a manner that every second pulse adds to the peak of the sawtooth waveform, thereby causing the neon bulb to ionize and start conducting immediately. The range over which such a synchronizing voltage is effective is determined by the relative magnitudes of the sawtooth waveform and of the synchronizing pulse.

In accordance with the present invention, the synchronizing voltage for the tone generator circuit of FIG. 2 is obtained from junction of resistors $R_3$ and $R_6$. These resistors form a voltage divider across the master oscillator output, since the full output voltage can not be used. An important aspect of this invention is the reliable synchronization, which is achieved primarily by returning all of the neon bulbs 46, 48 and 50 to ground through the same voltage divider resistor $R_6$. This insures that the synchronizing pulse will be added to the voltage already across the bulb due to the charge on the capacitor.

Another important aspect of this invention is that this circuit (FIG. 2) synchronizes on the negative-going portion of the synchronizing pulse rather than on the positive-going portion, as is the conventional method. As an example, consider the operation of the first divider 40. The synchronizing voltage substracts from the voltage across the neon bulb 46 twice during one cycle of the first divided 40. When the second synchronizing pulse starts decreasing, the voltage across the bulb 46, which is already near the breakdown voltage of the bulb 46, will increase at a rapid rate, causing the bulb 46 to ionize, thus sychronizing it at half the master oscillator frequency. The waaeform at the first divider 40 is shown in FIG 2*c*. The sychronizing pulses are exaggerated in FIG. 2*c* to emphasize their action. The dotted line in FIG. 2*c* shows the shape of the free running waveform.

Another important aspect of this invention is the fact that the dividers operate with an extremely low current drain. This makes it possible for the life of the 90 v. battery to be nearly equal to shelf life.

In viewing the circuit of FIG. 2 it should be noted that the voicing resistors $VR_1$, $VR_2$, $VR_3$, and $VR_4$ are isolating resistors which serve two functions. These voicing resistors not only isolate the oscillators 40, 42, and 44 from each other, but they also help to set the desired oscillator output levels.

Particular values of the circuit parameters which may be used in constructing oscillators to provide the 44 notes listed above are indicated below.

VOICING RESISTORS

| Note | No. | Value |
|---|---|---|
| C1 | 1 | 2.2M |
| C2 | 4 | 820K |
| C3 | 4 | 517K |
| C4 | 3 | 750K |
| B1 | 1 | 2.2M |
| B2 | 4 | 1.2M |
| B3 | 4 | 470K |
| B4 | 2 | 680K |
| A#1 | 1 | 2.2M |
| A#2 | 4 | 1.0M |
| A#3 | 4 | 680K |
| A#4 | 2 | 560K |
| A1 | 1 | 2.2M |
| A2 | 4 | 900K |
| A3 | 4 | 680K |
| A4 | 2 | 900K |
| G#1 | 1 | 2.2M |
| G#2 | 4 | 820K |
| G#3 | 4 | 680K |
| G#4 | 1 | 500K |
| G1 | 2 | 2.2M |
| G2 | 4 | 1.2M |
| G3 | 4 | 680K |
| G4 | 1 | 560K |
| F#1 | 2 | 1.95M |
| F#2 | 4 | 500K |
| F#3 | 4 | 900K |
| F#4 | 1 | 820K |
| F1 | 2 | 2.2M |
| F2 | 4 | 500K |
| F3 | 4 | 1.0M |
| F4 | 1 | 820K |
| E1 | 3 | 2.7M |
| E2 | 4 | 820K |
| E3 | 3 | 560K |
| D#1 | 3 | 2.7M |
| D#2 | 4 | 990K |
| D#3 | 3 | 560K |
| D1 | 3 | 2.7M |
| D2 | 4 | 820K |
| D3 | 3 | 680K |
| C#1 | 3 | 2.7K |
| C#2 | 4 | 820K |
| C#3 | 3 | 680K |

NOTE.—Filter input, 1.3±.13 volts.

OSCILLATOR AND DIVIDER CAPACITORS

| Note | $C_1$ | $C_2$ | $C_3$ | $C_4$ | $C_5$ | $C_6$ | $C_7$ | $C_8$ | $C_9$ | $C_{10}$ |
|---|---|---|---|---|---|---|---|---|---|---|
| C | .5 | .24 | .5 | .54 | .0004 | .004 | .0008 | .01 | .0018 | .018 |
| B | .5 | .24 | .5 | .54 | .00047 | .004 | .0008 | .01 | .0018 | .018 |
| A# | .5 | .24 | .5 | .54 | .00057 | .0047 | .0008 | .01 | .0018 | .018 |
| A | .5 | .32 | .5 | .54 | .00057 | .0047 | .0008 | .01 | .002 | .018 |
| G# | .5 | .32 | .5 | .54 | .00057 | .0047 | .0008 | .01 | .0025 | .022 |
| G | .5 | .32 | .5 | .54 | .00057 | .0047 | .0008 | .01 | .003 | .027 |
| F# | .5 | .32 | .5 | .75 | .0005 | .005 | .0015 | .01 | .003 | .022 |
| F | .5 | .32 | .5 | .75 | .0005 | .005 | .0015 | .01 | .003 | .022 |
| E | .5 | .32 | .5 | .75 | .0006 | .0068 | .0015 | .02 | | |
| D# | .5 | .57 | .5 | .75 | .0008 | .0082 | .0015 | .02 | | |
| D | .5 | .57 | .5 | .75 | .0008 | .0082 | .0022 | .02 | | |
| C# | .5 | .57 | .5 | .75 | .0008 | .0082 | .0022 | .02 | | |

OSCILLATOR AND DIVIDER RESISTORS

| Note | $R_1$ | $R_2$ | $R_3$ | $R_4$ | $R_5$ | $R_6$ | $R_7$ | $R_9$ | $R_{10}$ | $R_{12}$ | $R_{14}$ | $R_{15}$ | $R_{17}$ |
|---|---|---|---|---|---|---|---|---|---|---|---|---|---|
| C | 3.9K | 470 | 68K | 1M | 3M | 120K | 560K | 1M | 3M | 560K | 1M | 3M | 560K |
| B | 3.9K | 470 | 68K | 1M | 3M | 120K | 560K | 1M | 3M | 560K | 1M | 3M | 560K |
| A# | 3.9K | 470 | 68K | 1M | 3M | 120K | 560K | 1M | 3M | 560K | 1M | 3M | 560K |
| A | 5.6K | 470 | 68K | 1M | 3M | 120K | 560K | 1M | 3M | 560K | 1M | 3M | 560K |
| G# | 5.6K | 470 | 68K | 1M | 3M | 120K | 560K | 1M | 3M | 560K | 1M | 3M | 560K |
| G | 5.6K | 470 | 68K | 1M | 3M | 102K | 560K | 1M | 3M | 560K | 1M | 3M | 560K |
| F# | 6.8K | 470 | 68K | 1M | 3M | 120K | 560K | 1M | 3M | 560K | 1M | 3M | 560K |
| F | 6.8K | 470 | 68K | 1M | 3M | 120K | 560K | 1M | 3M | 560K | 1M | 3M | 560K |
| E | 6.8K | 470 | 68K | 1M | 3M | 120K | 560K | 1M | 3M | 560K | | | |
| D# | 6.8K | 470 | 68K | 1M | 3M | 120K | 560K | 1M | 3M | 560K | | | |
| D | 6.8K | 470 | 68K | 1M | 3M | 120K | 560K | 1M | 3M | 560K | | | |
| C# | 6.8K | 470 | 68K | 1M | 3M | 120K | 560K | 1M | 3M | 560K | | | |

Selected ones of the available notes are then applied to the buses which include an eight-foot bus, a "third" bus, a "fifth" bus, and a four-foot bus, as indicated in FIG. 3. As will be understood by those skilled in the musical arts, the eight-foot bus carries the fundamental frequency and the four-foot bus carries the octave frequency, and "third" and "fifth" refer to the third and fifth notes of the major scale which, in conjunction with the fundamental, form the major triad. For the 44 available notes listed above, the organ keyboard contains 32 keys which are depressed by the played to produce the melody and chords desired. Each key connects four different available notes to the four buses respectively, as noted.

In FIG. 3, only a portion of the switching circuitry is shown to illustrate how the desired combinations of notes may be connected to the buses. For example, when key number 8 on the keyboard is depressed, contacts 70 are closed connecting note C4 (indicating the C note produced by frequency divider 3—see the list of available notes above) to the eight-foot bus, the E3 note to the "third" bus, the G3 note to the "fifth" bus, and the C3 note to the four-foot bus. As a second example, when key number 7 of the keyboard is depressed, notes B4, D#3, F#3, and B3 are connected respectively to the eight-foot bus, "third" bus, "fifth" bus, and four-foot bus. The remaining 30 keys connect other notes to the buses in accordance with the following table:

KEY SWITCHES

| Keys | 8′ bus | 3rd bus | 5th bus | 4′ bus |
|---|---|---|---|---|
| 1.F | F4 | A4 | C4 | F3 |
| 2.F# | F#4 | A#4 | C#3 | F#3 |
| 3.G | G4 | B4 | D3 | G3 |
| 4.G# | G#4 | C4 | D#3 | G#3 |
| 5.A | A4 | C#3 | E3 | A3 |
| 6.A# | A#4 | D3 | F3 | A#3 |
| 7.B | B4 | D#3 | F#3 | B3 |
| 8.C | C4 | E3 | G3 | C3 |
| 9.C# | C#3 | F3 | G#3 | C#2 |
| 10.D | D3 | F#3 | A3 | D2 |
| 11.D# | D#3 | G3 | A#3 | D#2 |
| 12.E | E3 | G#3 | B3 | E2 |
| 13.F | F3 | A3 | C3 | F2 |
| 14.F# | F#3 | A#3 | C#2 | F#2 |
| 15.G | G3 | B3 | D2 | G2 |
| 16.G# | G#3 | C3 | D#2 | G#2 |
| 17.A | A3 | C#2 | E2 | A2 |
| 18.A# | A#3 | D2 | F2 | A#2 |
| 19.B | B3 | D#2 | F#2 | B2 |
| 20.C | C3 | E2 | G2 | C2 |
| 21.C# | C#2 | F2 | G#2 | C#1 |
| 22.D | D2 | F#2 | A2 | D1 |
| 23.D# | D#2 | G2 | A#2 | D#1 |
| 24.E | E2 | G#2 | B2 | E1 |
| 25.F | F2 | A2 | C2 | F1 |
| 26.F# | F#2 | A#2 | C#1 | F#1 |
| 27.G | G2 | B2 | D1 | G1 |
| 28.G# | G#2 | C2 | D#1 | G#1 |
| 29.A | A2 | C#1 | E1 | A1 |
| 30.A# | A#2 | D1 | F1 | A#1 |
| 31. B | B2 | D#1 | F#1 | B1 |
| 32.C | C2 | E1 | G1 | C1 |

The switching circuits described above allow a player to play the organ in a conventional manner, forming chords with the player's hands, and also allows one to play with a single finger and obtain both the melody and the chords. Although in the above described embodiment there is available the fundamental, "third," and "fifth," etc. forming a major triad, in a larger embodiment of the invention, there would be available more notes so one could also obtain minor triads, seventh chords, etc.

Figure 4:
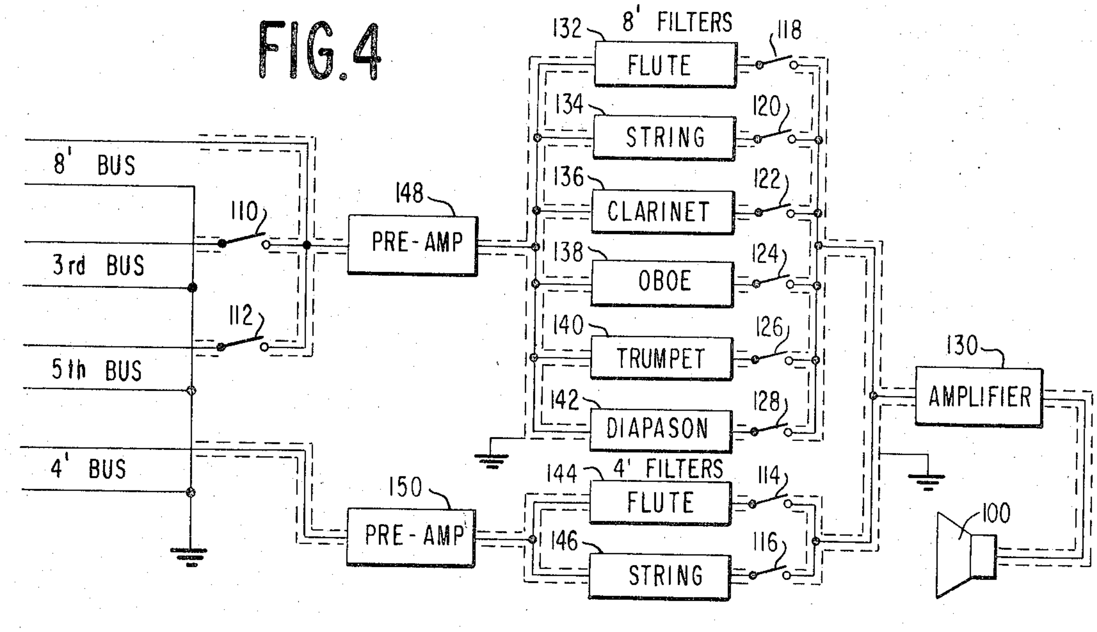
FIG. 4 is a block diagram of the voicing and output section of the present invention.

The remainder of the electronic organ, including the connections between the buses and output speaker 100, is shown in FIG. 4. The notes on the eight-foot bus, the "third" bus, and the "fifth" bus, are applied, when switches 110 and 112 are closed through a pre-amplifier 148 to the eight-foot filters 132 through 142. The particular eight-foot filter or filters connected into the circuit is a matter of choice and is controlled by switches 118 through 128 which are located near the keyboard within easy reach of the player. The note on the four-foot bus is applied through pre-amplifier 150 to the four-foot filters 144 and 146 which are selectively inserted into the circuit by means of panel switches 114 and 116, also within easy reach of the player. The filter outputs are connected to an amplifier 130 which in turn applies its output to the loud speaker 100.

Figure 5:
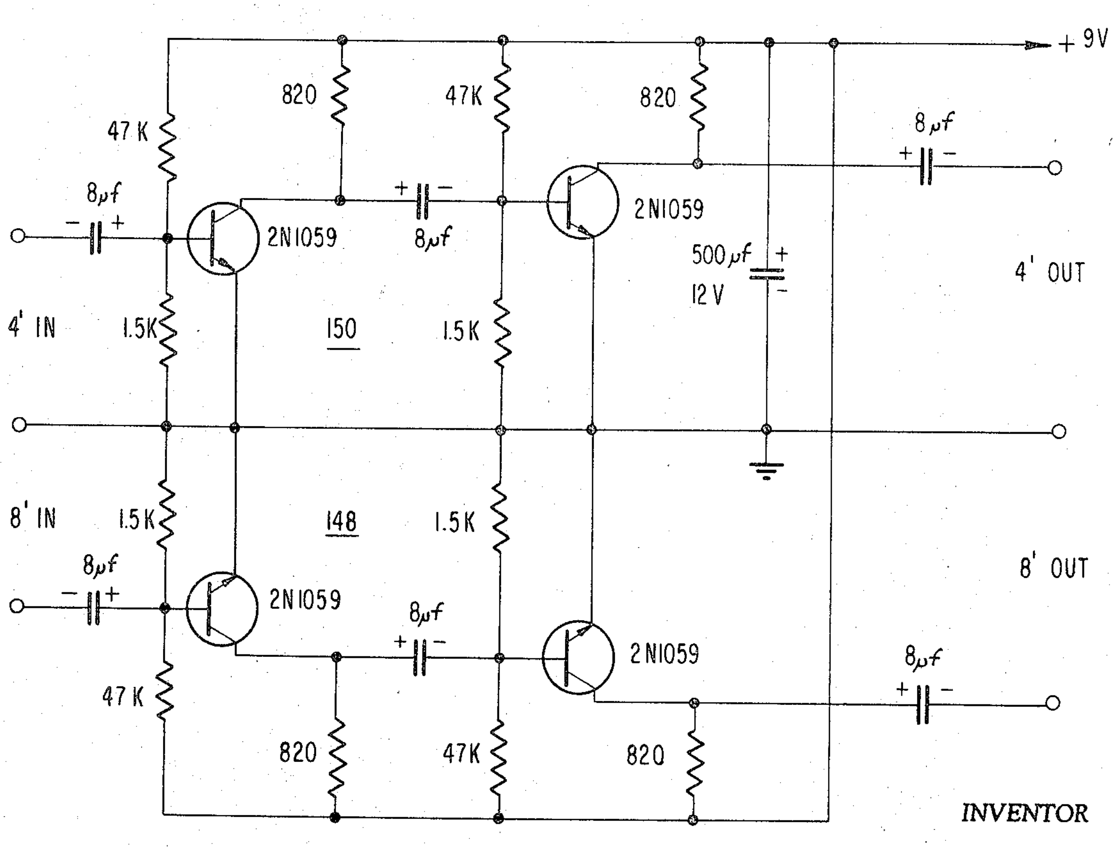
FIGS. 5 and 6 are schematics of amplifiers useful in the present invetnion.
Figure 6:
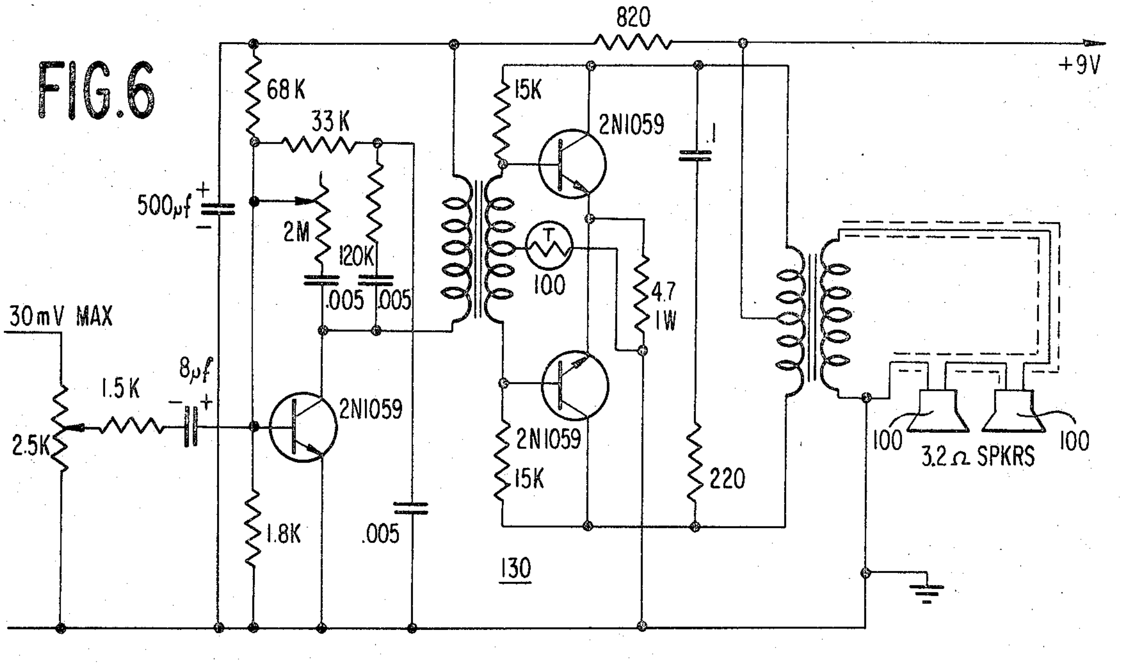
Figure 7:
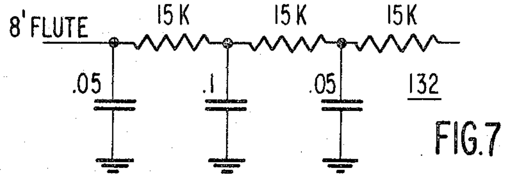
FIGS. 7–14 are schematics of filters useful in the present invention.
Figure 11:
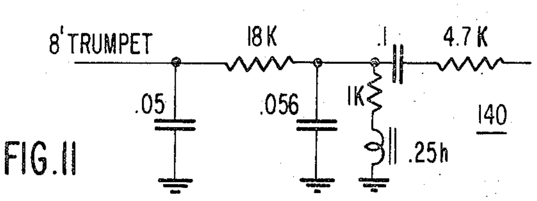
Figure 8:
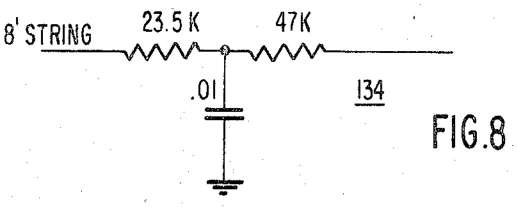
Figure 12:
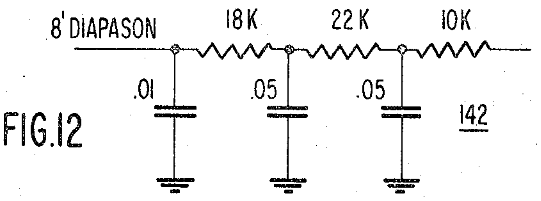
Figure 9:
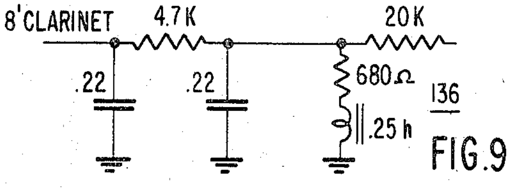

Although the pre-amplifiers 148 and 150 and the amplifier 130 may have various designs, particular pre-amplifier and amplifier circuits which are suitable for use in the present invention are indicated by the circuit diagrams in FIGS. 5 and 6. In FIG. 5, each pre-amplifier comprises two stages of grounded emitter amplification and in FIG. 6 the amplifier 130 comprises a first grounded emitter stage which drives an output push pull stage which in turn drives the speaker 100.

Figure 13:
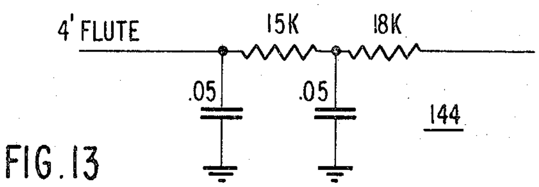
Figure 10:
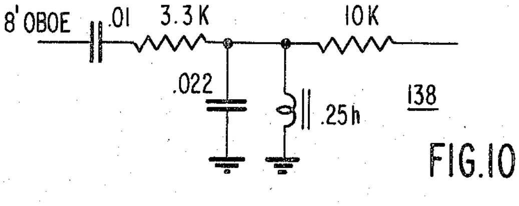
Figure 14:
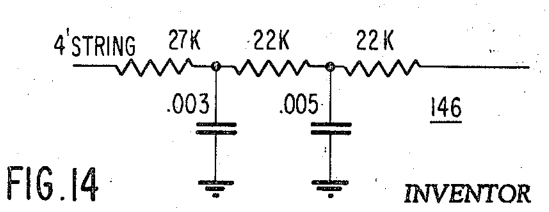

Referring back to FIG. 4, the filters, 132 through 146, when connected into the circuit, receive periodic wave forms which are rich in harmonics, and are designed to shape these wave forms in accordance with shapes normally associated with various musical instruments. Although the voicing system of FIG. 4 includes eight filters, 132 through 146, it is not limited to those filters shown. Since the tones are produced by filtering harmonically rich electrical waves, any number as well as any type of voices can be produced. However, in a preferred embodiment of the invention, filters 132 through 142 may be designed as shown in FIGS. 7 through 12 respectively, and filters 144 and 146 may be designed as shown in FIGS. 13 and 14 respectively.

It should be noted that switches 110, 112, 114 and 116 may all be disconnected, thereby allowing the depression of a single key on the keyboard to produce only a single note rather than an entire chord.

While the invention has been particularly shown and described with reference to a preferred embodiment thereof, it will be understood by those skilled in the art that various changes in form and details may be made therein without departing from the spirit and scope of the invention.

What is claimed is:

1. A portable electronic chord organ comprising (a) a number $n$ of transistor Hartley oscillators for producing $n$ different notes on the musical scale, (b) $n$ groups of frequency dividers, each group connected to a particular one of said oscillators for producing notes at submultiples of the note produced by the particular oscillator, whereby the total number of separate notes produced is equal to the sum of all oscillators, and frequency dividers, (c) an amplifier having its output connected to a loud speaker, (d) first and second pre-amplifiers, (e) an eight-foot bus, a "third" bus, a "fifth" bus, and a four-foot bus, (f) a keyboard having a plurality of depressable keys, (g) switching means responsive to the depression of a key on the keyboard for connecting four notes to said buses respectively whereby each key depression causes a different combination of four notes to be connected to said buses and each combination represents a musical triad plus octave, the notes of the triad being connected to the eight-foot bus, "third" and "fifth" buses respectively and the octave note being connected to the four-foot bus, said four-foot bus being connected to the input of said second pre-amplifier and said eight-foot bus being connected to the input of said first pre-amplifier, (h) first and second bus switches for connecting said "third" bus and said "fifth" bus, respectively, to the input of said first pre-amplifier, (i) a plurality of filters for imparting different sounds to the notes applied thereto, a first group of said plurality of filters having inputs applied thereto from the output of said first pre-amplifier, and a second group of said plurality of filters having inputs applied thereto from the output of said second pre-amplifier, and (j) switching means for connecting selected ones of said plurality of filters to the input of said amplifier.

2. The portable electronic chord organ as claimed in claim 1 wherein each frequency divider comprises a neon bulb relaxation oscillator having a free running frequency slightly below the desired submultiple of the Hartley oscillator frequency with which said relaxation oscillator is associated, and voltage divider means connecting the output of the associated Hartley oscillator to the relaxation oscillator for synchronizing the relaxation oscillator for synchronizing the relaxation oscillator.

3. The portable electronic chord organ as claimed in claim 2 wherein each said Hartley oscillator comprises a tuned L-C circuit and a single transistor, the output from each of said Hartley oscillators being taken from the collector of the transistor.

4. An electronic chord organ comprising (a) twelve transistor oscillators for producing twelve different notes on the musical scale, (b) twelve groups of frequency dividers, each group connected to a particular one of said oscillators for producing notes at submultiples of the note produced by the particular oscillator, whereby the total number of separate notes produced is equal to the sum of all oscillators and frequency dividers, (c) an amplifier having its output connected to a loudspeaker, (d) a preamplifier means, (e) an eight-foot bus, at least two intermediate buses including a first intermediate bus and a second intermediate bus, and a four-foot bus, (f) a keyboard having a plurality of depressible keys, (g) switching means responsive to the depression of a key on the keyboard for connecting at least four notes to said buses, respectively, whereby each key depression causes a different combination of notes to be connected to said buses and each combination represents a musical triad plus octave, the note of the triad being connected to the eight-foot bus and to two of said intermediate buses respectively, and the octave note being connected to the four-foot bus, said four-foot bus being connected to a first input of said pre-amplifier means and said eight-foot bus being connected to a second input of said pre-amplifier means, (h) intermediate bus switches for connecting said intermediate buses to said preamplifier means, (i) a plurality of filters for imparting different sounds to the notes applied thereto, said filters having inputs applied thereto from said pre-amplifier means, and (j) switching means for connecting selected ones of said plurality of filters to the input of said amplifier.

5. The electronic chord organ as claimed in claim 4 wherein each frequency divider comprises a neon bulb relaxation oscillator having a free running frequency slightly below the desired submultiple of an associated transistor oscillator frequency and voltage divider means connecting the output of the associated transistor oscillator to the relaxation oscillator for synchronizing said relaxation oscillator.

6. The electronic chord organ as claimed in claim 5 wherein each relaxation oscillator includes a neon bulb, and the voltage divider means includes connections of all of said neon bulbs to ground through a single voltage divider resistor.

7. The electronic chord organ as claimed in claim 4 wherein each group of frequency dividesr associated with the first eight transistor oscillators comprises three relaxation oscillators, each group of frequency dividers associated with the remaining four transistor oscillators comprising two relaxation oscillators.

References Cited

UNITED STATES PATENTS

| | | | |
|---|---|---|---|
| 2,128,367 | 8/1938 | Kock | 84—1.25 X |
| 3,099,700 | 7/1963 | Bergman | 84—1.19 |
| 3,379,820 | 4/1968 | Olson | 84—1.24 |

WARREN E. RAY, Primary Examiner

U.S. Cl. X.R.

84—1.04, 1.11, 1.19